United States Patent
Kraut

Patent Number: 6,076,925
Date of Patent: Jun. 20, 2000

[54] EYEGLASS HOLDER

[76] Inventor: Herman H. Kraut, 14 Bailey Rd., Fairfield, Conn. 06432

[21] Appl. No.: 09/430,539

[22] Filed: Oct. 29, 1999

[51] Int. Cl.[7] ........................................... G02C 5/14
[52] U.S. Cl. .................................. 351/112; 24/3.3
[58] Field of Search ..................... 351/112, 111, 351/121; 24/3.3

[56] References Cited

U.S. PATENT DOCUMENTS

| | | | |
|---|---|---|---|
| 4,894,887 | 1/1990 | Ward, II | 24/3 |
| 5,033,612 | 7/1991 | Bivins | 206/5 |
| 5,351,098 | 9/1994 | McDaniels et al. | 351/112 |
| 5,860,191 | 1/1999 | Sieger | 24/3.3 |
| 5,956,812 | 9/1999 | Moenning | 24/3.3 |

*Primary Examiner*—Hung Xuan Dang
*Attorney, Agent, or Firm*—Fattibene & Fattibene; Arthur T. Fattibene; Paul A. Fattibene

[57] ABSTRACT

This disclosure is directed to an eyeglass holder arranged to be worn on one's clothing and includes a base defining a jaw to which there is pivoted a movable jaw and a mounting ring connected to the base for supporting an elastic or flexible "0" ring for receiving the earpiece of a pair of eyeglasses and arranged to swivel so that the eyeglasses assume a normal flat position relative to the body.

7 Claims, 2 Drawing Sheets

EYEGLASS HOLDER

FIELD OF THE INVENTION

This invention relates to eyeglass holders, and more specifically to a personal eyeglass holder that can be readily clipped or supported to one's clothing.

BACKGROUND OF THE INVENTION

Eyeglass holders conventionally generally comprise a case or pouch for storing eyeglasses, which the user normally carried in a pocket or purse. Other eyeglass holders in the form of a cord or necklace having loops formed at the opposed ends of the cord for receiving the earpiece of the eyeglass, which may be worn about the user's neck, are also known. Other efforts have been made to hold an eyeglass as noted in U.S. Pat. Nos. 4,894,887; 5,033,612; 5,351,098 and 5,860,191.

The eyeglass holders of the type disclosed in U.S. Pat. Nos. 4,894,887 and 5,351,098 utilize a non-spring tension dependent foldover type clip which is limited for use on garments of limited thickness to which it can be conveniently attached. The eyeglass holder of U.S. Pat. No. 5,033,612 utilizes a non-clip pin, i.e. a safety type pin, which requires the pin to perforate one's clothing which, in many instances, may not be desirable for use on dresses and/or other clothing which the user may not wish to be subjected to pin holes. Eyeglass holders of the type disclosed in U.S. Pat. No. 5,860,191 employ a combination of a clothespin type holder and a spring clip, both of which are limited to a given thickness of material to which the holder may be attached. U.S. Pat. No. 5,860,191 discloses an eyeglass holder preferably formed of a wire frame which loosely supports the earpiece of the eyeglass therein in a fixed position relative to the clip.

Each of the above noted efforts have their advantages and disadvantages. Accordingly, there exists a need to provide for a more simplified and versatile type of eyeglass holder.

SUMMARY OF THE INVENTION

An object of this invention is to provide a personal eyeglass holder which is readily simple in construction, positive in operation, and readily inexpensive to manufacture.

Another object is to provide for a personal eyeglass holder utilizing a clip capable of being securely supported on clothing ranging from thin to thick, e.g. from a shirt to an outerwear garment such as an overcoat or heavy jacket.

Another object is to provide an eyeglass holder which can be worn on any part of one's garment.

Another object is to provide an eyeglass holder with a flexible eyeglass support which is sufficiently flexible to substantially conform to an earpiece of the eyeglass for firmly securing the eyeglass.

The foregoing objects and other features and advantages are attained by an eyeglass holder having a base which defines the fixed jaw of a clip. One end of the base is reversely bent at an angle to the base to define a yoke about which a movable jaw is pivoted about a yoke pin. A pig tail spring is coiled about the yoke pin to normally bias the movable jaw to a normally closed position relative to the base. The movable jaw is provided with a series of serrations or teeth adjacent the closed end of the movable jaw.

A mounting ring is connected to one end of the base to which a resilient or flexible "O" ring is connected to support the earpiece of the eyeglass. The arrangement is such that the clip defined can be readily attached to any part of a user's clothing, which may range in thickness from very light to very heavy.

IN THE DRAWINGS

DETAILED DESCRIPTION OF THE PREFERRED EMBODIMENT

Figure 1:
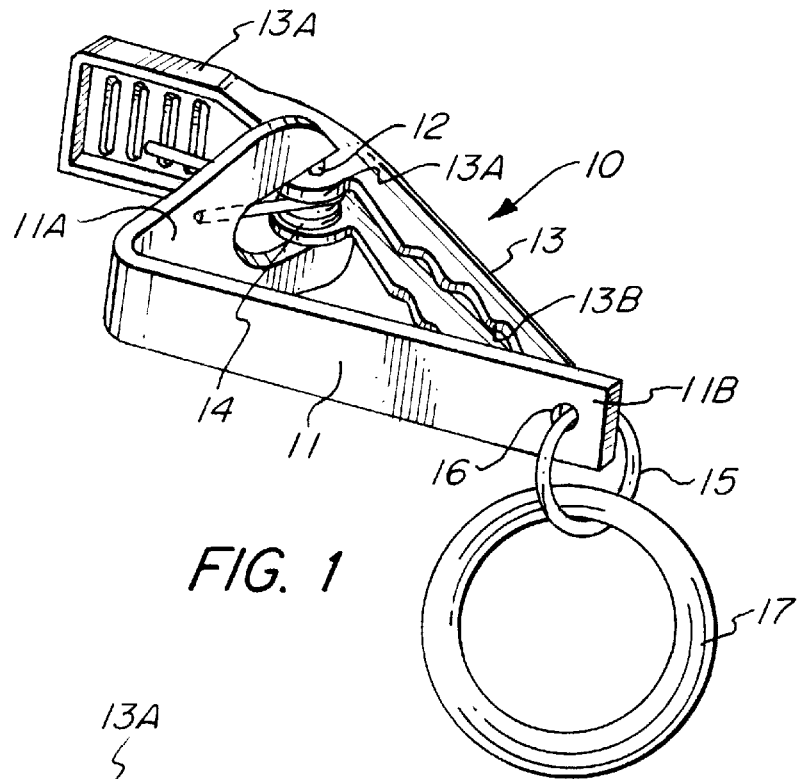
FIG. 1 is a perspective view of an eyeglass holder embodying the invention.
Figure 2:
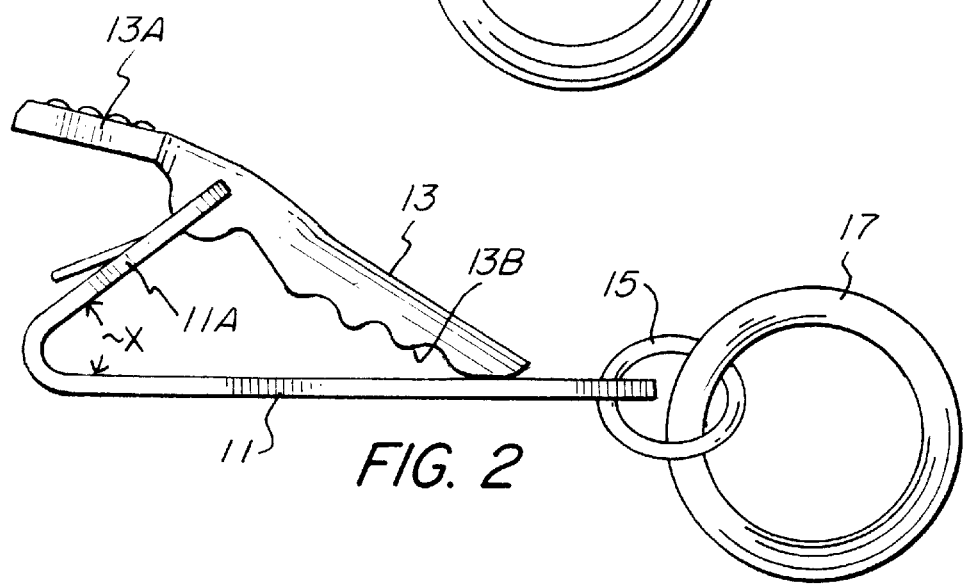
FIG. 2 is a side elevation view of FIG. 1.
Figure 3:
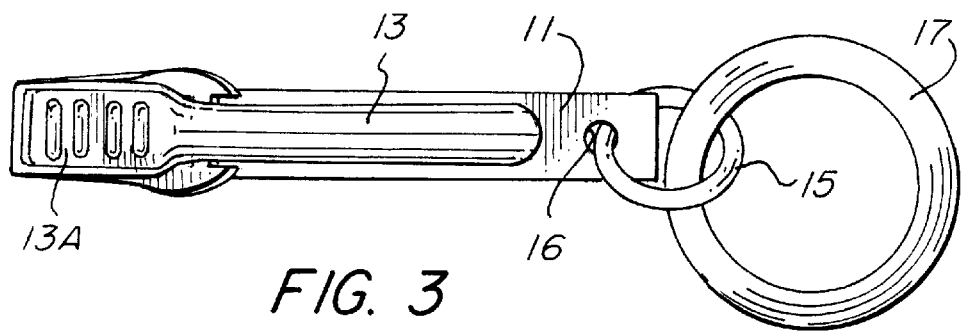
FIG. 3 is a top view of FIG. 1.
Figure 4:
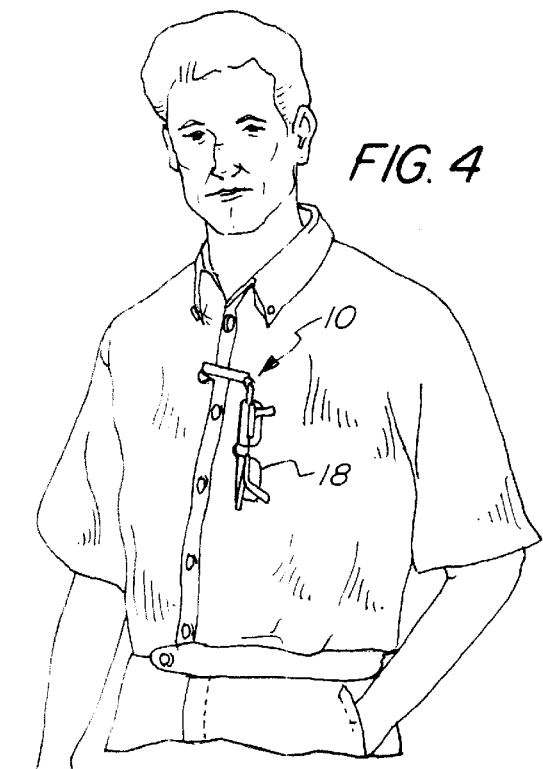
FIG. 4 illustrates one manner by which the eyeglass holder of FIG. 1 may be used.

Referring to the drawings, e.g. FIG. 1, there is illustrated an embodiment of the invention. As shown, the eyeglass holder 10 includes a base 11 that is reversely bent at one end thereof to define a yoke 11A disposed at an angle X relative to the base 11. As noted in FIG. 1, the yoke is bifurcated.

A pivot pin 12 traverses the bifurcated ends of the yoke 11A. A movable jaw 13 is provided intermediate the ends thereof with a saddle 13A through which pivot pin 12 extends so that the movable jaw may be pivoted relative to the base between an open and closed position. A pig tail spring 14 is looped about the pivot pin 12 so that the respective ends of the pig tail spring 14 are biased between the yoke 11A and the outer end 13A of the movable jaw 13 to normally bias the movable jaw 13 toward the closed position against the base 11. The construction of the clip described is such that the opening range of the movable jaw 13 relative to the base 11 is quite large so that the described holder can be securely gripped to clothing ranging from thin, e.g. a shirt, to heavy, e.g. an outer garment or overcoat. To provide for a firm grip, the closed end of the movable jaw may be provided with serrations or teeth 13B.

Connected to the end 11B of the base is a mounting ring 15 which passes through a small hole 16 formed in the end 11B of the base 11.

Figure 5:
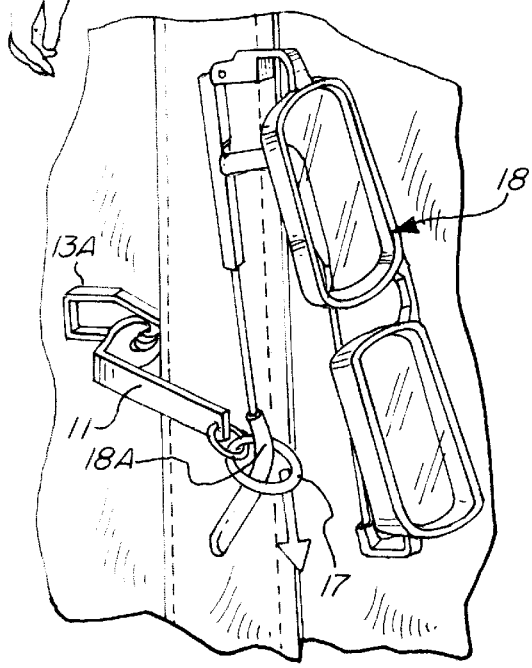
FIG. 5 is an enlarged detail view illustrating the manner of attaching the eyeglass to the holder.
Figure 6:
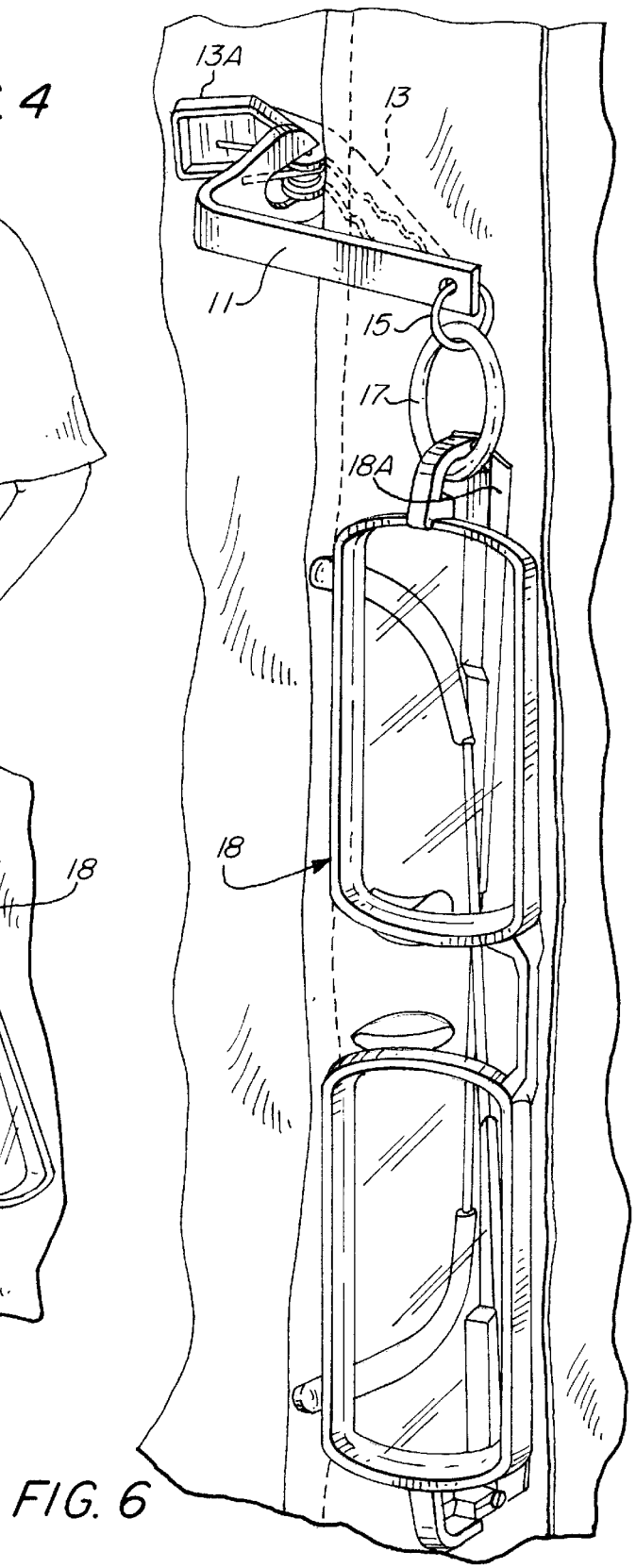
FIG. 6 is a perspective showing of the eyeglass holder and eyeglasses supported therein.

Supported on the mounting ring 15 is a flexible or resilient "O" ring 17 which may be formed of rubber or the like. To support the eyeglasses 18, one of the earpiece or temple piece 18A of a pair of eyeglasses is inserted into the "O" ring 17 as shown in FIG. 5 to support the eyeglasses 18 therein. It will be apparent that the user may clip the eyeglass holder 10 to any part of the user's clothing. In supporting the eyeglasses in the flexible "O" ring 17, the weight of the glasses will automatically stretch the "O" ring from a normal circular form to a distorted oval shape and in doing so causes the "O" ring to conform to the shape of the earpiece and thereby securely holds the eyeglasses from being inadvertently removed or released from its holding in the "O" ring 17. See FIG. 6. Also, the arrangement described allows the eyeglass, when supported in the holder 10, to swivel relative thereto so that the eyeglass supported therein will automatically assume a normal "flat" position relative to the body of the wearer. See FIGS. 1 and 6.

From the foregoing, it will be readily apparent that the eyeglass holder 10 is extremely simple and positive in operation, in which the eyeglass is firmly supported in a manner that will resist any unintentional separation of the eyeglass from its holder, and that the eyeglass holder 10 may be suitably supported on any part of one's clothing which enhances its versatility.

The holder 10 described is relatively small but sturdy and can be worn in small places like on the lapel of a coat and/or even as a tie pin. It can be worn either in a vertical or horizontal position and is more versatile than the known eyeglass holders.

While the present invention has been described with respect to a particular embodiment, modifications and variations may be made without departing from the spirit or scope of this invention.

What is claimed is:

1. A personal eyeglass holder comprising:

a base member, said base member having one end thereof reversely bent at an angle relative to said base member;

a movable jaw pivotally mounted on the said reversely bent end;

means for normally biasing said movable jaw toward a normally closed position relative to the base;

and a resilient eyeglass support connected to the other end of said base, said resilient eyeglass support being adapted to support an earpiece of said eyeglass thereon, whereby the weight of the eyeglass causes the resilient eyeglass support to deform to firmly grip the earpiece therein.

2. A personal eyeglass holder as defined in claim 1 wherein said resilient support comprises a deformable "0" ring.

3. A personal eyeglass holder as defined in claim 2 and including a mounting ring interconnecting said resilient "0" to the end of said base member.

4. A personal eyeglass holder as defined in claim 1 and including a series of serrations formed on said movable jaw adjacent the closed position thereof.

5. An eyeglass holder comprising:

a clip having a base member defining a fixed jaw having opposed end portions;

a jaw pivotally connected to one end of said base member to define a movable jaw movable between an open and closed position relative to said base member;

a spring for normally maintaining said movable jaw toward a normally closed position relative said fixed jaw;

a resilient eyeglass support connected to the other end of said fixed jaw;

said resilient eyeglass support being readily deformable by the weight of said eyeglass supported thereon so that said resilient support tend to close onto an eyepiece of said eyeglass to firmly grip the same.

6. An eyeglass holder as defined in claim 5 wherein said eyeglass support comprises a resilient "0" ring.

7. An eyeglass holder comprising:

a base member having opposed ends, one end being reversely bent at an angle relative to the plane of said base member, said one end being bifurcated to define a yoke;

a pivot pin connected between the bifurcated ends of said yoke;

a movable jaw pivoted intermediate its opposed end portion about said pivot pin for movement between open and closed positions relative to said base member;

a spring for normally biasing said movable jaw toward a closed position relative to said base member;

a series of serrations formed on said movable jaw adjacent the closed end position thereof, a mounting ring connected to the other end of said base member, and a resilient "0" ring connected to said mounting ring, said resilient "0" ring being adapted to receive an earpiece of said eyeglass to support said eyeglass, and said base member and movable jaw defining a clip which may be attached to any part of one's clothing.

* * * * *